United States Patent
Nagraj et al.

(10) Patent No.: US 11,829,736 B2
(45) Date of Patent: Nov. 28, 2023

(54) METHOD OF OPTIMIZING REGISTER MEMORY ALLOCATION FOR VECTOR INSTRUCTIONS AND A SYSTEM THEREOF

(71) Applicant: Blaize, Inc., El Dorado Hills, CA (US)

(72) Inventors: Pathikonda Datta Nagraj, Pradesh (IN); Aravind Rajulapudi, Telangana (IN); Ravi Korsa, Telangana (IN)

(73) Assignee: Blaize, Inc., El Dorado Hills, CA (US)

( * ) Notice: Subject to any disclaimer, the term of this patent is extended or adjusted under 35 U.S.C. 154(b) by 100 days.

(21) Appl. No.: 17/668,161

(22) Filed: Feb. 9, 2022

(65) Prior Publication Data
US 2023/0251836 A1    Aug. 10, 2023

(51) Int. Cl.
*G06F 8/41* (2018.01)
*G06F 9/50* (2006.01)

(52) U.S. Cl.
CPC .............. *G06F 8/41* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 5,551,039 A * | 8/1996 | Weinberg | G06F 8/445 717/146 |
| 6,625,724 B1 | 9/2003 | Kahn et al. | |
| 8,776,030 B2 | 7/2014 | Grover et al. | |
| 9,606,797 B2 | 3/2017 | Vaidya et al. | |
| 2008/0141012 A1* | 6/2008 | Yehia | G06F 9/30032 712/226 |
| 2013/0290674 A1* | 10/2013 | George | G06F 8/314 712/201 |
| 2016/0048445 A1* | 2/2016 | Gschwind | G06F 7/76 717/130 |
| 2016/0179524 A1* | 6/2016 | Gschwind | G06F 8/445 712/222 |
| 2017/0052769 A1* | 2/2017 | Gschwind | G06F 8/4441 |
| 2019/0087188 A1 | 3/2019 | Vaidyanathan et al. | |

* cited by examiner

*Primary Examiner* — Qing Chen
(74) *Attorney, Agent, or Firm* — Brian R. Short

(57) ABSTRACT

The present disclosure relates to a system and a method of optimizing register allocation by a processor. The method comprising receiving an intermediate representation (IR) code of a source code and initializing single instruction multiple data (SIMD) width for the IR code. The method comprising analyzing each basic block of the IR code to classify determine one or more instructions of the IR code as vector instructions, wherein each basic block is one of LOAD, STORE and arithmetic logical and multiply (ALM) instructions. The method comprising dynamically setting the SIMD width for each of the vector instructions.

21 Claims, 4 Drawing Sheets

| R1 | R2 | R3 | R4 |
| --- | --- | --- | --- |
| R5 | R6 | R7 | R8 |
| R9 | R10 | R11 | R12 |
| R13 | R14 | R15 | R16 |

US 11,829,736 B2

METHOD OF OPTIMIZING REGISTER MEMORY ALLOCATION FOR VECTOR INSTRUCTIONS AND A SYSTEM THEREOF

TECHNICAL FIELD

The present disclosure relates to computer systems in general and more particularly, to compilers that optimize register memory allocation for vector instructions.

BACKGROUND

Modern computer systems have evolved into extremely powerful devices with advances in both hardware and software, and hence have improved the performance of the computer systems. Recently, modern software used in the modern computer systems also becoming very complex and includes tens to millions of lines of code or instructions. The execution time of a computer software or computer program is very closely associated with the quantity and complexity of instructions that are executed. Thus, as the quantity and complexity of computer instructions increase, the execution time of the computer program increases as well.

Many of the computer programs are written in high level language and converted into a stream of machine code instructions that are eventually executed on the computer systems by its compiler. Generally, compiler allocates available physical registers to variables in the computer program affects the execution time of the computer program. Presently, all the available solutions offer fixed register memory allocation for vector instructions irrespective of the memory requirement of the vector instructions. However, due to the allocation of fixed register memory allocation, there will be only few threads that can run parallel which will further slowdown the execution speed of the program. Thus, it is desirous to have a compiler that optimizes register memory allocation and increase the number of threads that can run parallel thereby increasing the execution speed of the program.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Embodiments of the present disclosure relate to a method of optimizing vector register allocation by a processor. The method comprising receiving an intermediate representation (IR) code of a source code and initializing single instruction multiple data (SIMD) width for the IR code. The method comprising analyzing each basic block of the IR code to classify determine one or more instructions of the IR code as vector instructions, wherein each basic block is one of LOAD, STORE and arithmetic logical and multiply (ALM) instructions. The method comprising dynamically setting the SIMD width for each of the vector instructions.

Another aspect of the present disclosure relates to a system to optimize register allocation. The system comprising a memory and a processor, coupled to the memory. The processor is configured to receive an intermediate representation (IR) code of a source code and initialize single instruction multiple data (SIMD) width for the IR code. The processor is further configured to analyse each basic block of the IR code to classify determine one or more instructions of the IR code as vector instructions, wherein each basic block is one of LOAD, STORE and arithmetic logical and multiply (ALM) instructions. The processor is also configured to dynamically setting the SIMD width for each of the vector instructions.

Yet another aspect of the present disclosure relates to a non-transitory computer readable medium comprising instructions that, when executed, cause one or more processors to receive an intermediate representation (IR) code of a source code and initialize single instruction multiple data (SIMD) width for the IR code. The one or more processors is further configured to analyse each basic block of the IR code to classify determine one or more instructions of the IR code as vector instructions, wherein each basic block is one of LOAD, STORE and arithmetic logical and multiply (ALM) instructions. The one or more processors is also configured to dynamically setting the SIMD width for each of the vector instructions The aforementioned aspects of the present disclosure may overcome one or more of the shortcomings of the prior art. Additional features and advantages may be realized through the techniques of the present disclosure. Other embodiments and aspects of the disclosure are described in detail herein and are considered a part of the claimed disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
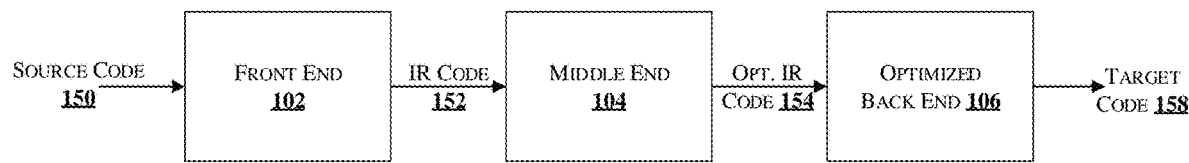
FIG. 1 illustrates an exemplary architecture of an optimized compiler in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of an optimized compiler in accordance with some embodiments of the present disclosure.

As shown in FIG. 1, an optimized compiler 100 has a broad classification of different phases of compiler design that comprises a frond end 102, a middle end 104, and an optimized back end 106. The front end 102 typically comprises a lexical analyser, a syntax analyser, a semantic analyser, and intermediate code generator. The lexical analyser converts a source code 150 into tokens and removes white-spaces and comments. The syntax analyser constructs a parse tree by inputting all the tokens one by one and uses context free grammar for constructing the parse tree. The semantic analyser verifies the parse tree and produces a verified parse tree. The intermediate code generator generates an intermediate representation (IR) code 152 of the source code 150.

The middle end 104 comprises a code optimizer which performs optimization on the IR code 152 in order to improve the performance and quality of a target code. The middle end 104 commonly transforms the IR code 152 into an optimized IR code 154 so that the optimized IR code 154 consumes fewer resources and produces more speed. The optimized back end 106 comprises a target code generator that converts the optimized IR code 154 into a target code 158 based on target CPU architecture.

The middle end 104, as shown in the FIG. 1 receives the Intermediate Representation (IR) code 152 of the source code 150 and generates the optimized IR code 154, and the optimized IR code 154 is further translated to the target code 158. Intermediate codes can be represented in number of ways like high-level IR, low-level IR etc. The high-level IR is very close to the source code and is less effective for target machine optimization. The low-level IR is close to target machine, which makes it suitable for register and memory allocation, instruction set selection etc. Modern compiler infrastructures are designed around a low-level IR that serves as a portable, high-level assembly language that can be optimized with a variety of transformations over multiple passes. The present invention relates to a type of transformation method and device which can enhance the performance of the compiler by using an optimized register memory allocation for vector instructions using the optimized back end 106.

The optimized backend 106 implements an optimized memory allocation which translates the optimized IR code 154 to the target code 158, wherein the target code 158 is executed in the machine in lesser compilation time and requiring lesser computing capacity.

In one embodiment, the optimized register memory allocation as mentioned above identifies one or more vector instructions, and dynamically assign the one or more available physical registers to the identified vector instructions.

Figure 2:
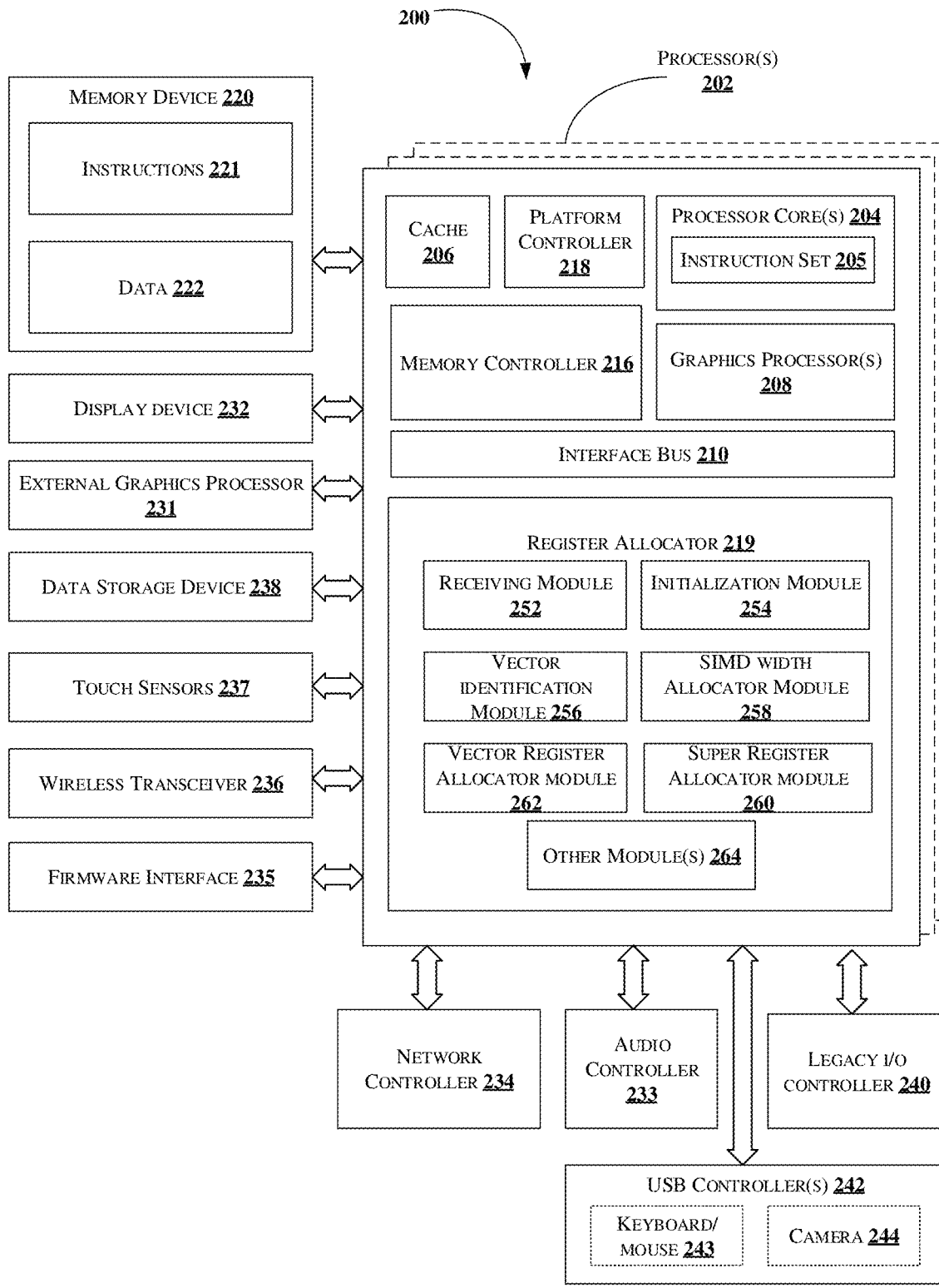
FIG. 2 is a block diagram of an exemplary computing system to optimize register allocation, in accordance with some embodiments of the present disclosure.

FIG. 2 is a block diagram of a computing system to optimize register allocation, in accordance with some embodiments of the present disclosure.

In various embodiments the system 200 may be a single processor desktop system, a multiprocessor workstation system, or a server system having a large number of processors 202. In one embodiment, the system 200 is a processing platform incorporated within a system-on-a-chip (SoC) integrated circuit for use in mobile, handheld, or embedded devices.

In one embodiment the system 200 can include or be incorporated within a server-based gaming platform, a game console, including a game and media console, a mobile gaming console, a handheld game console, or an online game console. In some embodiments the system 200 is a mobile phone, smart phone, tablet computing device or mobile Internet device. The processing system 200 can also include couple with, or be integrated within a wearable device, such as a smart watch wearable device, smart eyewear device, augmented reality device, or virtual reality device. In some embodiments, the computing system 200 is a television or set top box device having one or more processors 202 and a graphical interface generated by one or more graphics processors 208.

In some embodiments, the one or more processors 202 each include one or more processor cores 204 to process instructions which, when executed, perform operations for system and user software. In some embodiments, each of the one or more processor cores 204 is configured to process a specific instruction set 205. Processor core 204 may also include other processing devices, such a Digital Signal Processor (DSP).

In some embodiments, the processor 202 includes cache memory 206. Depending on the architecture, the processor 202 can have a single internal cache or multiple levels of internal cache. In some embodiments, the cache memory 206 is shared among various components of the processor 202. In some embodiments, the processor 202 also uses an external cache (e.g., a Level-3 (L3) cache or Last Level Cache (LLC)) (not shown), which may be shared among processor cores 204 using known cache coherency techniques.

In some embodiments, one or more processor(s) 202 are coupled with one or more interface bus 210 to transmit communication signals such as address, data, or control signals between processor 202 and other components in the system 200. The interface bus 210, in one embodiment, can be a processor bus, such as a version of the Direct Media Interface (DMI) bus. However, processor bus is not limited to the DMI bus, and may include one or more Peripheral Component Interconnect buses (e.g., PCI, PCI Express), memory bus, or other types of interface bus. In one embodiment the processor(s) 202 include an integrated memory controller 216, a platform controller 218, and a register allocator 219. The memory controller 216 facilitates communication between a memory device and other components of the system 200, while the platform controller 218 provides connections to I/O devices via a local I/O bus.

The memory device 220 can be a dynamic random-access memory (DRAM) device, a static random access memory (SRAM) device, flash memory device, phase-change memory device, or some other memory device having suitable performance to serve as process memory. In one embodiment the memory device 220 can operate as system memory for the system 200, to store instructions 221 and data 222 for use when the one or more processors 202 executes an application or process. Memory controller 216 also couples with an optional external graphics processor 231, which may communicate with the one or more graphics processors 208 in processors 202 to perform graphics and media operations. In some embodiments a display device 232 can connect to the processor(s) 202. The display device 232 can be one or more of an internal display device, as in a mobile electronic device or a laptop device or an external display device attached via a display interface (e.g., DisplayPort, etc.). In one embodiment the display device 232 can be a head mounted display (HMD) such as a stereoscopic display device for use in virtual reality (VR) applications or augmented reality (AR) applications.

In some embodiments, the platform controller 218 enables peripherals to connect to memory device 220 and processor 202 via a high-speed I/O bus. The I/O peripherals include, but are not limited to, an audio controller 233, a network controller 234, a firmware interface 235, a wireless transceiver 236, touch sensors 237, a data storage device 238 (e.g., hard disk drive, flash memory, etc.). The data storage device 238 can connect via a storage interface (e.g., SATA) or via a peripheral bus, such as a Peripheral Component Interconnect bus (e.g., PCI, PCI Express). The touch sensors 237 can include touch screen sensors, pressure sensors, or fingerprint sensors. The wireless transceiver 226 can be a Wi-Fi transceiver, a Bluetooth transceiver, or a mobile network transceiver such as a 3G, 4G, or Long-Term Evolution (LTE) transceiver. The firmware interface 235 enables communication with system firmware, and can be, for example, a unified extensible firmware interface (UEFI). The network controller 234 can enable a network connection to a wired network. In some embodiments, a high-performance network controller (not shown) couples with the interface bus 210. The audio controller 233, in one embodiment, is a multi-channel high-definition audio controller. In one embodiment the system 200 includes an optional legacy I/O controller 240 for coupling legacy (e.g., Personal System 2 (PS/2)) devices to the system. The platform controller 218 can also connect to one or more Universal Serial Bus (USB) controllers 242 connect input devices, such as keyboard and mouse 243 combinations, a camera 244, or other USB input devices. The register allocator 219 comprises a receiving module 252, an initialization module 254, a vector identification module 256, a single instructions multiple data (SIMD) width allocator module 258, a super register allocator module 260, a vector register allocator module 262, and other module(s) 264. The modules may further include some other module to perform various miscellaneous functionalities of system 200. It will be appreciated that such aforementioned modules may be represented as a single module or combination of different modules. The one or more modules may be implemented in the form of system software performed by the processor 202.

In operation, the system 200 enables optimization of register allocation using the register allocator 219. In order to optimize register allocation, the receiving module 252 is configured to receive an intermediate representation (IR) code of a source code, as input.

The initialization module 254 is coupled to the receiving module 252. The initialization module 254 is configured to initialize a single instruction multiple data (SIMD) width for the IR code. The SIMD width indicates size of register memory that needs to be allocated for one or more instructions in the IR code. For example, Blaize Graph Stream Processor is configured to initialize the SIMD width for the IR code as 8*8 bytes (i.e., 512 bit). Upon receiving the IR code from the receiving module 252, the initialization module 254 is configured to initialize the SIMD width to the maximum available limit for program, so that the program having multiple threads can execute properly.

The vector identification module 256 is coupled to the receiving module 252. The vector identification module 256 is configured to analyse each basic block of the IR code to determine one or more instructions of the IR code as vector instructions. In one embodiment, each basic block is one of LOAD, STORE, and arithmetic logical and multiply (ALM) instructions. In order to analyse each of LOAD, STORE, and ALM instructions, the vector identification module 256 is configured to analyse source information contained in the LOAD, STORE, and ALM instructions. In one embodiment, the vector identification module 246 is configured to determine LOAD instructions as vector instructions when the source information contained in the LOAD instructions is dependent on a thread identity (ID). The presence of thread identity (ID) or the LOAD instruction is dependent on the thread ID indicate a multi-thread in the IR code. In another embodiment, the vector identification module 256 is configured to determine STORE and ALM instructions as vector instructions when the source information contained in the STORE and ALM instructions includes the vector instructions.

For example, if the program has following lines in the source code $X$=get_global_id(0);

$Y$=get_global_id(1);

int $c$=input0[$x$][$y$]+input1[$x$][$y$];

$C$+=const_value;

output[$x$][$y$]=$c$;

The vector identification module 256 is configured to analyse each basic block of the IR code as explained in the forthcoming paragraphs.

Firstly, the vector identification module 256 analyses the LOAD instructions (i.e., int c=input0[x][y]+input 1[x][y]). Based on the analyses, the variables x and y return the number for the current thread, which indicates a thread ID. Accordingly, the source information for the LOAD instructions (i.e., input0[x][y] and input 1[x][y] are dependent on thread id. Therefore, the instruction int c=input0[x][y]+input 1[x][y] is determined as the vector instruction.

Further, the vector identification module 256 analyses the ALM instructions (i.e., c+=const_value). Based on the analysis, the source information (i.e., variable 'c' is identified as vector in LOAD instruction) for the ALM instructions is identified vector instructions. Therefore, the instruction c+=const_value is determined as the vector instruction.

The SIMD width allocator module 258 is coupled to the vector identification module 256. In one embodiment, the SIMD width allocator module 258 is configured to dynamically set the SIMD width for each of the vector instructions. The SIMD width allocator module 258 is configured to dynamically set the SIMD width based on type of vector instruction that includes conditional operators, predefined math operations/functions, neighbouring pixel instruction.

For example, the source program of the IR code has following lines:

X=get_global_id(0);

Y=get_global_id(1);

Int A=input0[x][y];

Int B=input1[x][y];

Int C=0;

|

If (A==B)

C=A+B;

else

C=A−B;

C+=const_value;

Output[x][y]=C;

The SIMD width allocator module 258 is configured to dynamically set the SIMD width for the vector instruction (i.e., vector c) with 8*4 bytes (i.e., 256 bits), as the vector instructions includes conditional operators.

The super register allocator module 260 is configured to create one or more super registers by combining the one or more available logical registers. The one or more super registers are created by mapping one or more groups of one or more available logical registers (i.e., 8-bit registers) to one or more register classes. For example, the super register of size 16 bits (i.e., 16-bit register class) is created by combining two logical registers of size 8-bit. Similarly, the super register of size 64 bits (i.e., 64-bit register class) is created by combining eight logical registers each having size of 8-bit.

The vector register allocator module 262 is coupled to the SIMD width allocator module 258. The vector register allocator module 262 is configured to identify the vector instructions requiring more than one physical register and dynamically assign one or more physical registers to the identified vector instructions using the one or more register classes. In order to dynamically assign one or more physical registers, the vector register allocator module 262 is configured to allocate super register to each of the identified vector instructions, wherein the super register is created from one of the mapped register classes of the super register allocator module 262. Upon allocating the super register, the vector register allocator module 262 is configured to expand the super register allocated into the one or more physical registers. In one embodiment, expanding the super register is performed by duplicating the instructions and assigning the appropriate individual register from the set of super register allocated. In another embodiment, expanding the super register is performed by assigning starting individual register as destination and other adjacent logical registers are implicitly defined.

It will be appreciated that the system 200 shown is exemplary and not limiting, as other types of data processing systems that are differently configured may also be used. For example, an instance of the memory controller 216, platform controller 218, and register allocator 219 may be integrated into a discreet external graphics processor, such as the external graphics processor 231. In one embodiment the platform controller 218 and/or memory controller 216 may be external to the one or more processor 202. For example, the system 200 can include an external memory controller 216 and platform controller 218, which may be configured as a memory controller hub and peripheral controller hub within a system chipset that is in communication with the processor(s) 202.

Figure 3:
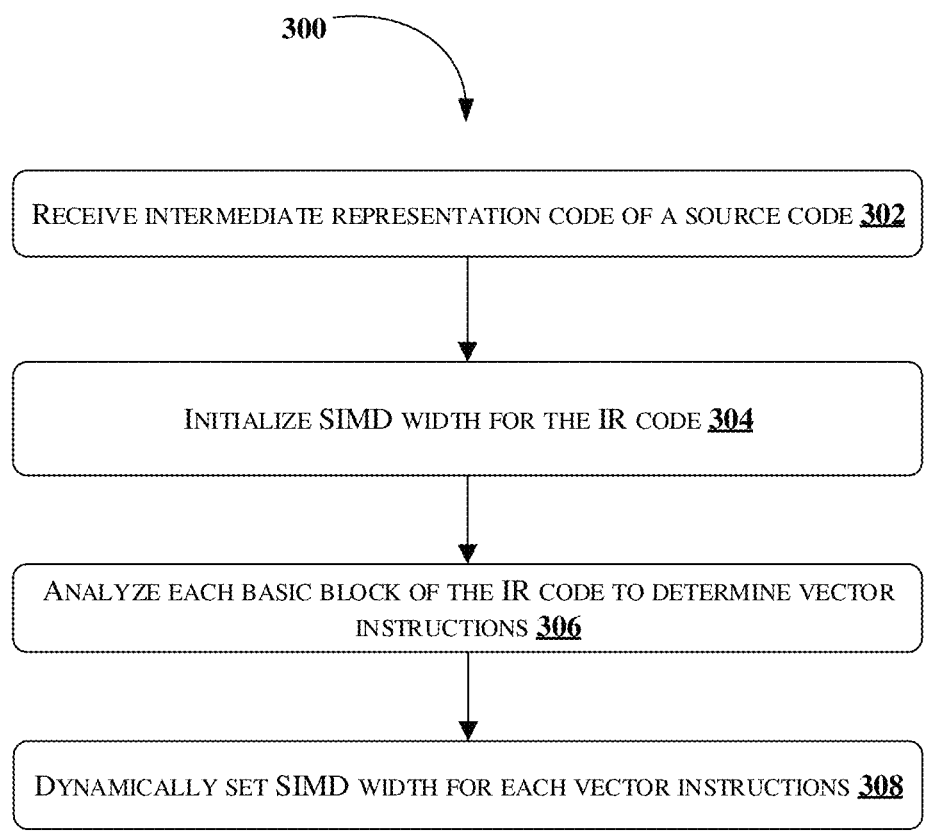
FIG. 3 shows a flow chart of an exemplary method of optimizing register allocation process in accordance with some embodiments of the present disclosure.

FIG. 3 illustrates a flow chart of an exemplary method of optimizing register allocation process in accordance with some embodiments of the present disclosure; and the method 300 comprises one or more blocks implemented by the computing system 200 for enabling optimization of scalar register allocation. The method 300 may be described in the general context of a computer processor executable instructions. Generally, computer processor executable instructions can include scalar instructions, vector instructions, comparison and selection-based instructions etc.

The order in which the method 300 is described in not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware having parallel processing capability, software executed by a processor, firmware, or combination thereof.

At block 302, an intermediate representation code of a source code is received by a receiving module 242. The receiving module 242 is configured to receive an intermediate representation code of a source code.

At block 304, a single instruction multiple data (SIMD) width for the IR code is initialized by the initialization module 244. The initialization module 244 is configured to initialize the single instruction multiple data (SIMD) width for the IR code. For example, Blaize Graph Stream Processor is configured to initialize the SIMD width for the IR code as 8*8.

At block 306, analyse each basic block of the IR code to determine one or more instructions of the IR code as vector instructions by the vector identification module 246. The vector identification module 246 is configured to analyse each basic block of the IR code to determine one or more instructions of the IR code as vector instructions. In one embodiment, each basic block is one of LOAD, STORE, and arithmetic logical and multiply (ALM) instructions. In order to analyse each of LOAD, STORE, and ALM instructions, the vector identification module 246 is configured to analyse source information contained in the LOAD, STORE, and ALM instructions. In one embodiment, the vector identification module 246 is configured to determine LOAD instructions as vector instructions when the source information contained in the LOAD instructions is dependent on a thread identity (ID). In another embodiment, the vector identification module 246 is configured to determine STORE and ALM instructions as vector instructions when the source information contained in the STORE and ALM instructions includes the vector instructions.

At block 308, the SIMD width for each of the vector instructions is dynamically set by a SIMD width allocator module 248. In one embodiment, the SIMD width allocator module 248 is configured to dynamically set the SIMD width for each of the vector instructions. In order to dynamically set the SIMD width, the SIMD width allocator module 248 is configured to dynamically set the SIMD width based on type of vector instruction that includes conditional operators, predefined math operations/functions, neighbouring pixel instruction. Upon setting the SIMD width for each of the vector instructions, the vector register allocator module 250 is configured to identify the vector instructions requiring more than one physical register and dynamically assign one or more physical registers to the identified vector instructions using the one or more register classes. In order to dynamically assign one or more physical registers, the vector register allocator module 250 is configured to allocate super register to each of the identified vector instructions, wherein the super register is created from one of the mapped register classes of the super register allocator module. Upon allocating the super register, the vector register allocator module 250 is configured to expand the super register allocated into the one or more physical registers.

Example:

In one example, if the processor 202 has 16 individual logical registers (i.e., R1 . . . R16) that are laid out as shown in FIG. 4, then the super register allocator module 260 creates one or more super registers from the 16 individual logical registers as explained in the forthcoming paragraphs.

The super register allocator module 260 is configured to create one or more super registers by combining the one or more available 16 logical registers (i.e., R1 . . . R16). The one or more super registers are created by mapping one or more groups of one or more available logical registers (i.e., 8-bit registers) to one or more register classes.

Figures 4, 5:
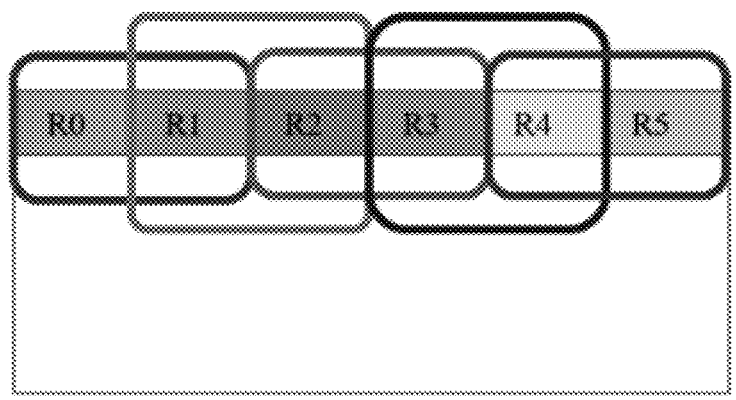
FIG. 4 shows an example scenario of register layout in the processor of FIG. 2, in accordance with some embodiments of the present disclosure.
FIG. 5 shows an example scenario of super register creation, in accordance with some embodiments of the present disclosure.

As shown in FIG. 5, there are 5 logical registers (i.e., R1, R2, R3, R4, and R5). In one embodiment, the super register allocation module 260 is configured to create super register of size 16 bits (i.e., 16-bit register class) by combining two logical registers as shown in FIG. 5 (i.e., one of R0R1, R1R2, R2R3, R3R4, R4R5).

In one embodiment, for the processor having 16 logical registers as shown in FIG. 4, the super register of size 16 bit may be created from the combination of R1R2, R2R3, R3R4, R4R5, . . . R15R16. In another embodiment, for the processor having 16 logical registers as shown in FIG. 4, the super register of size 16 bit may be created from the combination of R1R5, R2R6, R3R7, R4R8, . . . R12R16.

In one embodiment, the super register of size 24 bit may be created from the combination of R1R2R3, R2R3R4, . . . R14R15R16. In another embodiment, the super register of size 24 bit may be created from the combination of R1R5R9, R2R6R10, R3R7R11, . . . R8R12R16.

In one embodiment, the super register of size 32 bit may be created from the combination of R1R2R3R4, R5R6R7R8, R9R10R11R12, . . . R13R14R15R16. In another embodiment, the super register of size 32 bit may be created from the combination of R1R5R9R13, R2R6R10R14, . . . R4R8R12R16.

Thus, by using the optimized memory allocation, the performance of the compiler is enhanced by dynamically allocating one or more physical registers to the vector instructions. Further, by implementing the optimized memory allocation, the number of threads that can run parallel is increased, thereby increasing the execution speed of the program.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

We claim:

1. A method of optimizing register allocation by a processor, the method comprising:
receiving an intermediate representation (IR) code of a source code;
initializing single instruction multiple data (SIMD) width for the IR code of the source code;
analyzing each basic block of the IR code of the source code to determine one or more instructions of the IR code of the source code as vector instructions, wherein each basic block of the IR code of the source code is one of LOAD, STORE, and arithmetic logical and multiply (ALM) instructions, and wherein the LOAD, STORE, and ALM instructions contain source information; and dynamically setting the SIMD width for each of the vector instructions based on type of vector instruction.

2. The method as claimed in claim 1, wherein analyzing each basic block of the IR code of the source code includes analyzing the source information contained in the LOAD, STORE, and ALM instructions.

3. The method as claimed in claim 1, wherein the LOAD instructions are determined as the vector instructions when the source information contained in the LOAD instructions is dependent on a thread identity (ID), and wherein the thread identity (ID) indicates a presence of multi-thread in the IR code of the source code.

4. The method as claimed in claim 1, wherein the STORE and ALM instructions are determined as the vector instructions when the source information contained in the STORE and ALM instructions includes the vector instructions.

5. The method as claimed in claim 1, wherein dynamically setting the SIMD width for each of the vector instructions based on the type of vector instruction that includes conditional operators, predefined math operations/functions, and neighbouring pixel instruction.

6. The method as claimed in claim 1, further comprising:
identifying the vector instructions requiring more than one physical register;
mapping one or more groups of physical registers to one or more register classes; and
dynamically assigning one or more physical registers to the identified vector instructions using the one or more register classes.

7. The method as claimed in claim 6, wherein dynamically assigning the one or more physical registers to the identified vector instructions using the one or more register classes comprises:
allocating a super register to each of the identified vector instructions, wherein the super register is created from one of the one or more register classes; and
expanding the super register allocated into the one or more physical registers upon allocating the super register.

8. A system to optimize register allocation, the system comprising:
a memory; and
a processor, coupled to the memory, and configured to:
receive an intermediate representation (IR) code of a source code;
initialize single instruction multiple data (SIMD) width for the IR code of the source code;
analyze each basic block of the IR code of the source code to determine one or more instructions of the IR code of the source code as vector instructions, wherein each basic block of the IR code of the source code is one of LOAD, STORE, and arithmetic logical and multiply (ALM) instructions, and wherein the LOAD, STORE, and ALM instructions contain source information; and
dynamically set the SIMD width for each of the vector instructions based on type of vector instruction.

9. The system as claimed in claim 8, wherein to analyze each basic block of the IR code of the source code, the processor is further configured to analyze the source information contained in the LOAD, STORE, and ALM instructions.

10. The system as claimed in claim 8, wherein the processor is further configured to determine the LOAD instructions as the vector instructions when the source information contained in the LOAD instructions is dependent on a thread identity (ID), and wherein the thread identity (ID) indicates a presence of multi-thread in the IR code of the source code.

11. The system as claimed in claim 8, wherein the processor is further configured to determine the STORE and ALM instructions as the vector instructions when the source information contained in the STORE and ALM instructions includes the vector instructions.

12. The system as claimed in claim 8, wherein the processor is further configured to dynamically set the SIMD width for each of the vector instructions based on the type of vector instruction that includes conditional operators, predefined math operations/functions, and neighbouring pixel instruction.

13. The system as claimed in claim 8, wherein the processor is further configured to:
identify the vector instructions requiring more than one physical register;
map one or more groups of physical registers to one or more register classes; and
dynamically assign one or more physical registers to the identified vector instructions using the one or more register classes.

14. The system as claimed in claim 13, wherein to dynamically assign the one or more physical registers to the identified vector instructions using the one or more register classes, the processor is further configured to:
allocate a super register to each of the identified vector instructions, wherein the super register is created from one of the one or more register classes; and
expand the super register allocated into the one or more physical registers upon allocating the super register.

15. A non-transitory computer-readable medium storing instructions that, when executed by one or more processors, cause the one or more processors to:
receive an intermediate representation (IR) code of a source code;
initialize single instruction multiple data (SIMD) width for the IR code of the source code;
analyze each basic block of the IR code of the source code to determine one or more instructions of the IR code of the source code as vector instructions, wherein each basic block of the IR code of the source code is one of LOAD, STORE, and arithmetic logical and multiply (ALM) instructions, and wherein the LOAD, STORE, and ALM instructions contain source information; and
dynamically set the SIMD width for each of the vector instructions based on type of vector instruction.

16. The non-transitory computer-readable medium as claimed in claim 15, wherein to analyze each basic block of the IR code of the source code, the one or more processors are further configured to analyze the source information contained in the LOAD, STORE, and ALM instructions.

17. The non-transitory computer-readable medium as claimed in claim 15, wherein the one or more processors are further configured to determine the LOAD instructions as the vector instructions when the source information contained in the LOAD instructions is dependent on a thread identity (ID), and wherein the thread identity (ID) indicates a presence of multi-thread in the IR code of the source code.

18. The non-transitory computer-readable medium as claimed in claim 15, wherein the one or more processors are further configured to determine the STORE and ALM instructions as the vector instructions when the source information contained in the STORE and ALM instructions includes the vector instructions.

19. The non-transitory computer-readable medium as claimed in claim 15, wherein the one or more processors are further configured to dynamically set the SIMD width for each of the vector instructions based on the type of vector instruction that includes conditional operators, predefined math operations/functions, and neighbouring pixel instruction.

20. The non-transitory computer-readable medium as claimed in claim 15, wherein the one or more processors are further configured to:
   identify the vector instructions requiring more than one physical register;
   map one or more groups of physical registers to one or more register classes; and
   dynamically assign one or more physical registers to the identified vector instructions using the one or more register classes.

21. The non-transitory computer-readable medium as claimed in claim 20, wherein to dynamically assign the one or more physical registers to the identified vector instructions using the one or more register classes, the one or more processors are further configured to:
   allocate a super register to each of the identified vector instructions, wherein the super register is created from one of the one or more register classes; and
   expand the super register allocated into the one or more physical registers upon allocating the super register.

\* \* \* \* \*